(12) United States Patent
Jimenez (10) Patent No.: US 9,188,379 B2
(45) Date of Patent: Nov. 17, 2015

(54) ICE CHEST INSERT AND APPARATUS (71) Applicant: Jose Rosendo Jimenez, Hollywood, CA (US)

(72) Inventor: Jose Rosendo Jimenez, Hollywood, CA (US)

(*) Notice: Subject to any disclaimer, the term of this patent is extended or adjusted under 35 U.S.C. 154(b) by 63 days.

(21) Appl. No.: 13/938,626

(22) Filed: Jul. 10, 2013

(65) Prior Publication Data
US 2015/0014336 A1    Jan. 15, 2015

(51) Int. Cl.
B65D 25/04 (2006.01)
F25D 3/08 (2006.01)
F25D 23/06 (2006.01)

(52) U.S. Cl.
CPC . F25D 3/08 (2013.01); B65D 25/04 (2013.01); F25D 23/067 (2013.01); F25D 23/069 (2013.01); F25D 2303/081 (2013.01)

(58) Field of Classification Search
CPC ........... F25D 3/08; F25D 3/02; F25D 25/024; F25D 23/069; F25D 23/067; F25D 2303/081; B65D 25/101; B65D 25/10; B65D 25/04
USPC .................................... 220/915.2; 211/59.3
See application file for complete search history.

(56) References Cited

U.S. PATENT DOCUMENTS 3,327,655 A * 6/1967 MacKay ..................... 108/136
6,763,959 B2 * 7/2004 Tedder ......................... 211/188

* cited by examiner

Primary Examiner — Stephen Castellano
(74) Attorney, Agent, or Firm — Cohen IP Law Group, P.C.; Michael N. Cohen (57) ABSTRACT The present invention provides a food organizing insert for placement within an ice chest. The food organizing insert comprises a top shelf arranged for placing food items, drinks and ice, a bottom shelf attached to the top shelf by way of a plurality of posts, a plurality of threaded plugs designed to secure the plurality of posts in position and a plurality of holes positioned on the top shelf and the bottom shelf to insert the plurality of posts. Each of the plurality of posts is surrounded by a spring and the top shelf is provided with a perforated natural drip dry system on a top surface. The perforated natural drip dry system allows melted ice water to drip from the top shelf. The food organizing insert is placed within the ice chest to maintain the food items, drinks and ice in a chilled condition and elevated above the dirty water.

11 Claims, 7 Drawing Sheets

ICE CHEST INSERT AND APPARATUS

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE DISCLOSURE

This disclosure relates to inserts for ice chests, and more particularly to a portable insert for holding food and drinks within ice chests.

DISCUSSION OF RELATED ART

Ice chests are commonly used during picnics, vacations or holidays for keeping food and drinks in a chilled condition. Ice chests are usually filled with ice cubes to cool the food and drinks In some types of coolers, food and ice cubes are stored within the single open space within the ice chest resulting in the mixing of food items with ice and runoff water, which over time and with continual use of the cooler may contain dirt, food particles, debris, germs and bacteria. Some other types of ice chests employ shelves having separate storage areas for food items and ice cubes. Such types of ice chests require the shelves to be assembled within the ice chest, which can be time-consuming. Such ice chests do not allow the user to separate the shelves from the ice chests for transport and storage. Most of the coolers are bulky and hence cannot be easily stored and carried by the user. The main problem associated with the use of these ice chests is that the dirty melted water cannot be separated from the food items. Food items may become saturated and soggy in the presence of the water.

U.S. Pat. No. 6,698,230 issued to Brusky on Mar. 2, 2004 discloses an ice chest or cooler comprising a container including an insulating base and insulating sidewalls upstanding from the base. Within the container, a false floor is supported in a spaced relation from the insulating base and permits heat transfer across its thickness. The false floor has a perimeter located close or adjacent to the insulating sidewalls and an ice feed tube is secured to the false floor. The feed tube has a bore that opens into the space between the false floor and the insulating base to permit passage of ice cubes through the bore into the space between the false floor and the insulating base. Ice can be fed into the space between the false floor and the base of the container without removing food or drink containers above the false floor. While the container enables storage of food and drinks within the ice chest, the container cannot be separated from the ice chest in a manner similar to the present embodiment.

U.S. Pat. No. 6,349,559 issued to Hasanovic on Feb. 26, 2002, discloses a cooler chest with an ice-surrounding food compartment includes an outer container that supports an outer lid. An inner container having an inner lid is carried within the outer container. In use, an ice storage area is defined between the inner and outer containers food is contained within the inner container. Due to the curvature of the sidewall of the outer container and due to the sloping sidewall of the inner lid carried by the inner container, a flared ice entry passage is defined which aids in the addition of ice. However, the food compartment needs to be assembled by placing the inner container within the outer container which is difficult. Further, the assembling of the ice chest is a time-consuming process.

U.S. Pat. No. 5,437,165 issued to White on Aug. 1, 1995, describes a food organizing and protecting insert that includes a horizontal shelf with a food receptacle which mounts in a portable ice chest. The shelf occludes the upper region of the inner liner of the chest forming a closed chamber to hold ice when the chest lid is open. The food receptacles are held by their upper rims in the apertures so that the body of each receptacle is within the cooled chamber. One or more hinged transparent covers, when closed, cover the receptacles, leaving a space above the receptacle for clearance of a serving utensil while permitting viewing of the contents of the receptacles. Downwardly extending support members hold the shelf fixed position parallel to the bottom of the chest. The insert converts an ice chest into a sanitary and convenient food storage dispensing device for picnics, street vendors and restaurants. However, the insert is bulky and hence cannot be conveniently stored and carried by the user.

Therefore, there is a need for a device that provides a portable, easy-to-use insert for placement within ice chests. Such a needed device would be easily utilized to store food and drinks in a chilled condition and elevated above the dirty water. The device would include a top shelf for loading food, drinks and ice. Such a device would include a natural drip dry system to allow melted ice water to drip from the top shelf. The device would be spring loaded to allow the top shelf to lower and rise within the ice chest. Further, such a device would be easily separated from the ice chest for cleaning and storage. Such a device would be light weight and hence can be easily stored and carried by the user. The present embodiment accomplishes these objectives.

SUMMARY OF THE INVENTION

The present invention provides a food organizing insert for placement within an ice chest. The food organizing insert comprises a top shelf arranged for placing food items, drinks and ice, a bottom shelf attached to the top shelf by way of a plurality of posts, a plurality of threaded plugs designed to secure the plurality of posts in position and a plurality of holes positioned on the top shelf and the bottom shelf to insert the plurality of posts. Each of the plurality of posts is surrounded by a spring and the top shelf is provided with a perforated natural drip dry system on a top surface. The food organizing insert is placed within the ice chest to maintain the food items, drinks and ice in a chilled condition and above the melted water, which over time and with continual use of the cooler may contain dirt, food particles, debris, germs and bacteria. And to prevent the food items from becoming saturated of soggy in the presence of the water.

A method for assembling the food organizing insert is initiated by inserting the plurality of posts into the bottom shelf through the plurality of holes and securing the bottom end of each of the plurality of posts with each of the threaded plugs. Each of the plurality of posts is then surrounded by the spring. The top end of the each of the plurality of posts is then inserted through the plurality of holes of the top shelf. Finally, the top end is secured with the plurality of threaded plugs so as to secure the plurality of posts in position. Thus, the plurality of posts is threaded at both ends and is held in place by the plurality of holes, pressure caused by the spring and the plurality of threaded plugs.

While using the insert, the top shelf may be initially loaded with the food items, drinks and ice. The weight of the food items, drinks and ice lowers the top shelf until it reaches the bottom surface of the ice chest. When the springs have reached the limit to which the springs can compress, the top shelf may be left only inches above the bottom surface of the ice chest. As the food items and drinks are taken out of the top shelf, the weight loss allows the top shelf to slowly and gently rise. As time passes, ice starts melting from the top shelf, lessening the weight, thereby allowing the top shelf to rise gently. The melted ice water is then allowed to drip from sides of the top shelf. Alternately, the melted ice water may also drip from the perforated natural drip dry system. Finally, the melted ice water containing the germs and bacteria is allowed to rest at the bottom surface of the ice chest, instead of being mixed with food and drinks, creating unsanitary conditions.

The present invention provides a simple, convenient and portable insert for placement within the ice chest for holding the food items and drinks in a chilled and clean condition. The insert can be easily assembled by the user. The insert can be easily separated from the ice chest. The insert can also be easily disassembled for proper cleaning and compact storage. The insert is made of a light-weight material and hence can be easily stored and carried by the user.

BRIEF DESCRIPTION OF THE DRAWINGS

FIGS. 2-5 illustrate a method for assembling the food organizing insert in accordance with the preferred embodiment of the present invention;

DETAILED DESCRIPTION OF THE PREFERRED EMBODIMENT

A wide variety of inserts are available for keeping food and drinks in a chilled condition. These inserts are bulky and hence cannot be easily stored and carried by the user. Some of these inserts require to be assembled within the ice chest, which is time-consuming. In addition, the users often find it difficult to separate the insert from the ice chests for cleaning purposes. Efforts have been made to resolve the problems related to the food organizing inserts. The present invention overcomes the shortcomings of prior inventions by providing a simple, convenient and portable insert for holding the food items and drinks in a chilled, clean condition above the melted ice water.

Figure 1:
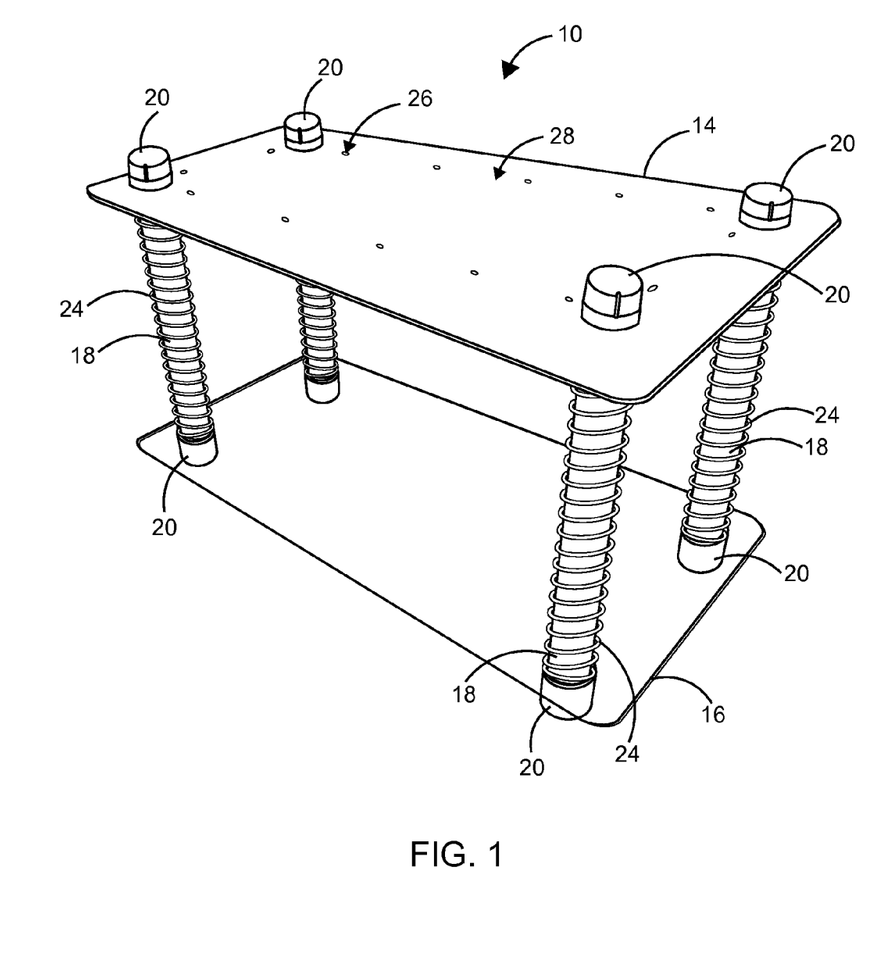
FIG. 1 illustrates a side perspective view of a food organizing insert in accordance with a preferred embodiment of the present invention.

FIG. 1 illustrates a side perspective view of a food organizing insert 10 for placement within an ice chest 12 in accordance with a preferred embodiment of the present invention. The food organizing insert 10 comprises a top shelf 14 arranged for placing food items, drinks and ice, a bottom shelf 16 attached to the top shelf 14 by way of a plurality of posts 18, a plurality of threaded plugs 20 designed to secure the plurality of posts 18 in position and a plurality of holes 22 positioned on the top shelf 14 and the bottom shelf 16 to insert the plurality of posts 18. Each of the plurality of posts 18 is surrounded by a spring 24 and the top shelf 14 is provided with a perforated natural drip dry system 26 on a top surface 28. The food organizing insert 10 is placed within the ice chest 12 to maintain the food items, drinks and ice in a chilled condition.

Figure 2:
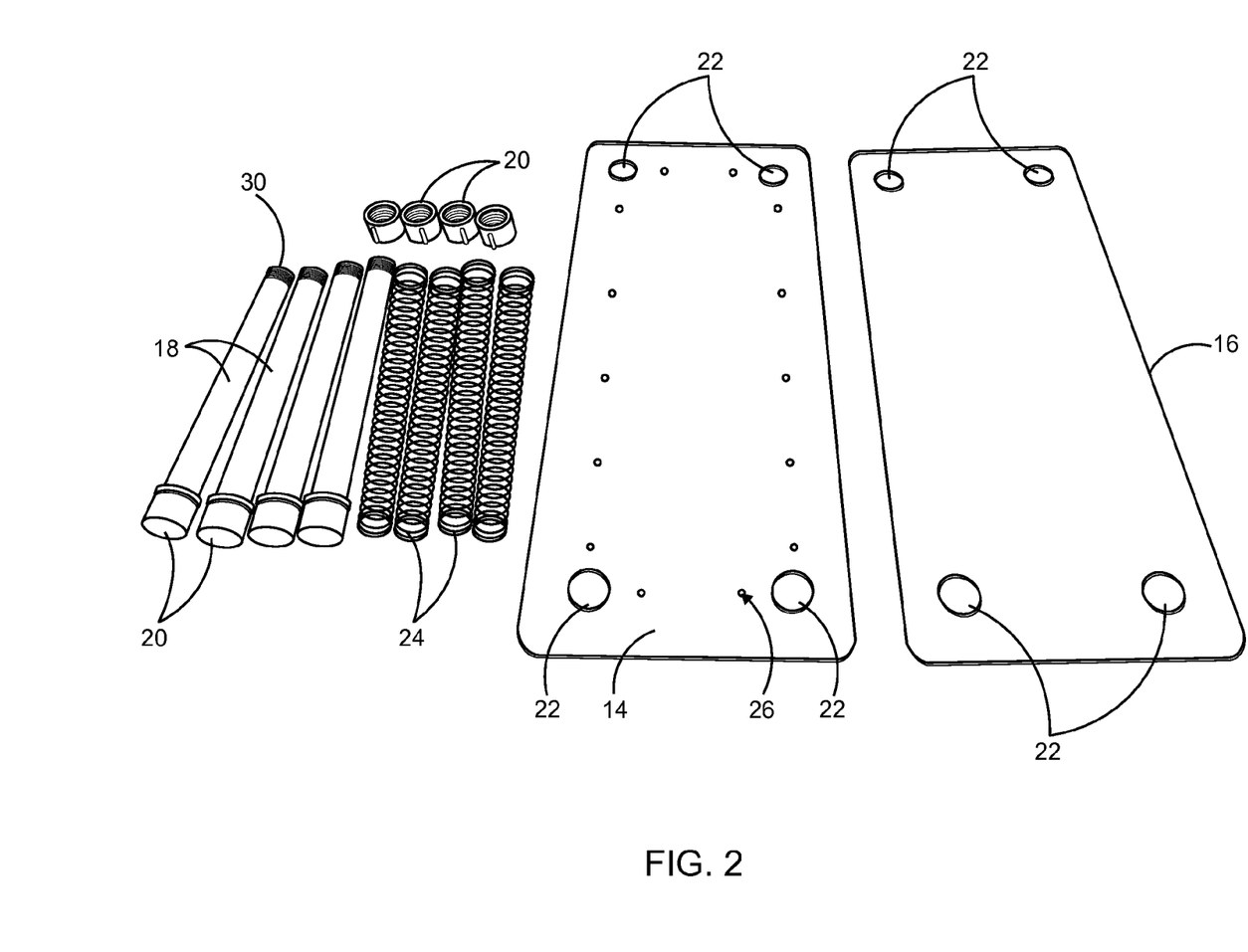
FIG. 2 illustrates an exploded view of the food organizing insert in accordance with the preferred embodiment of the present invention.

Referring to FIG. 2, an exploded view of the food organizing insert 10 in accordance with a preferred embodiment of the present invention is illustrated. The top shelf 14 is arranged for placing food items, drinks and ice. The top shelf 14 is provided with a perforated natural drip dry system 26 that allows melted ice water to drip from the top shelf 14. Both the top shelf 14 and the bottom shelf 16 are provided with the plurality of holes 22 to insert the plurality of posts 18. Each of the plurality of posts 18 is surrounded by the spring 24 thereby making the top shelf 14, spring loaded. Each of the plurality of posts 18 has a top end 30 and a bottom end (not shown). Both the top end 30 and the bottom end are secured by means of the plurality of threaded plugs 20. The plurality of threaded plugs 20 is also provided for insuring safety.

Figure 3:
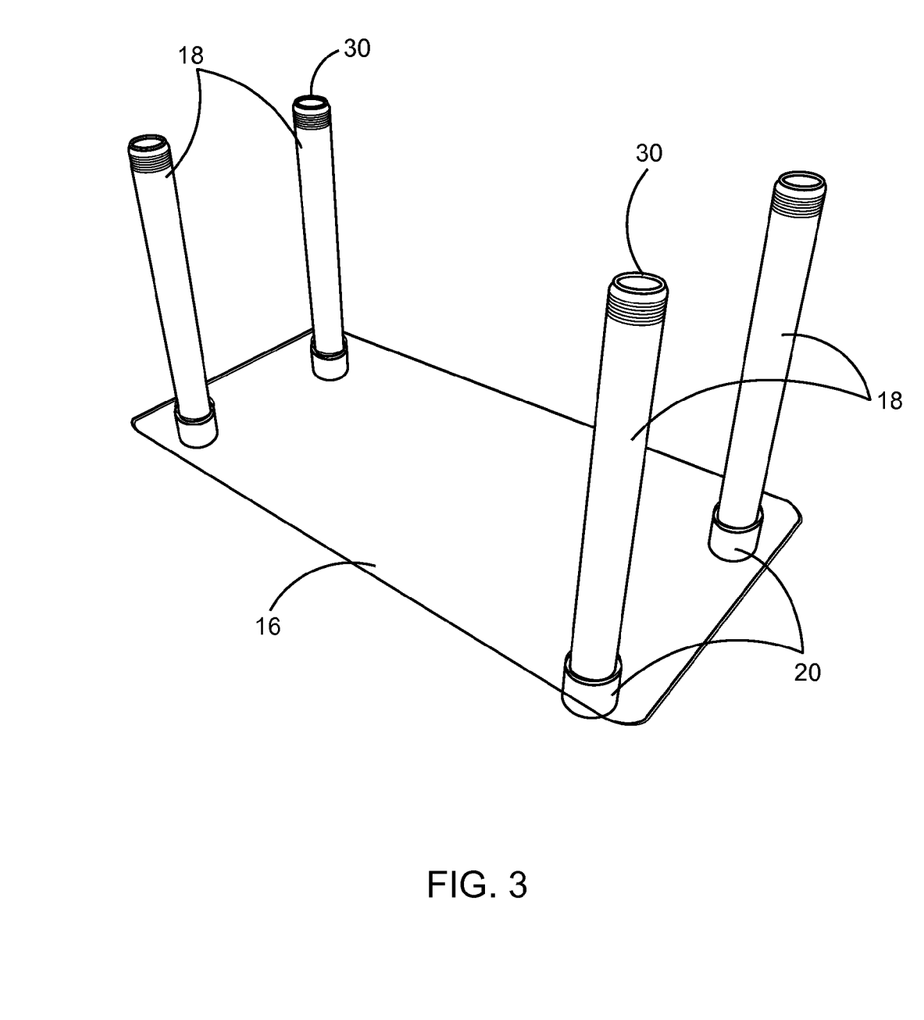
Figure 4:
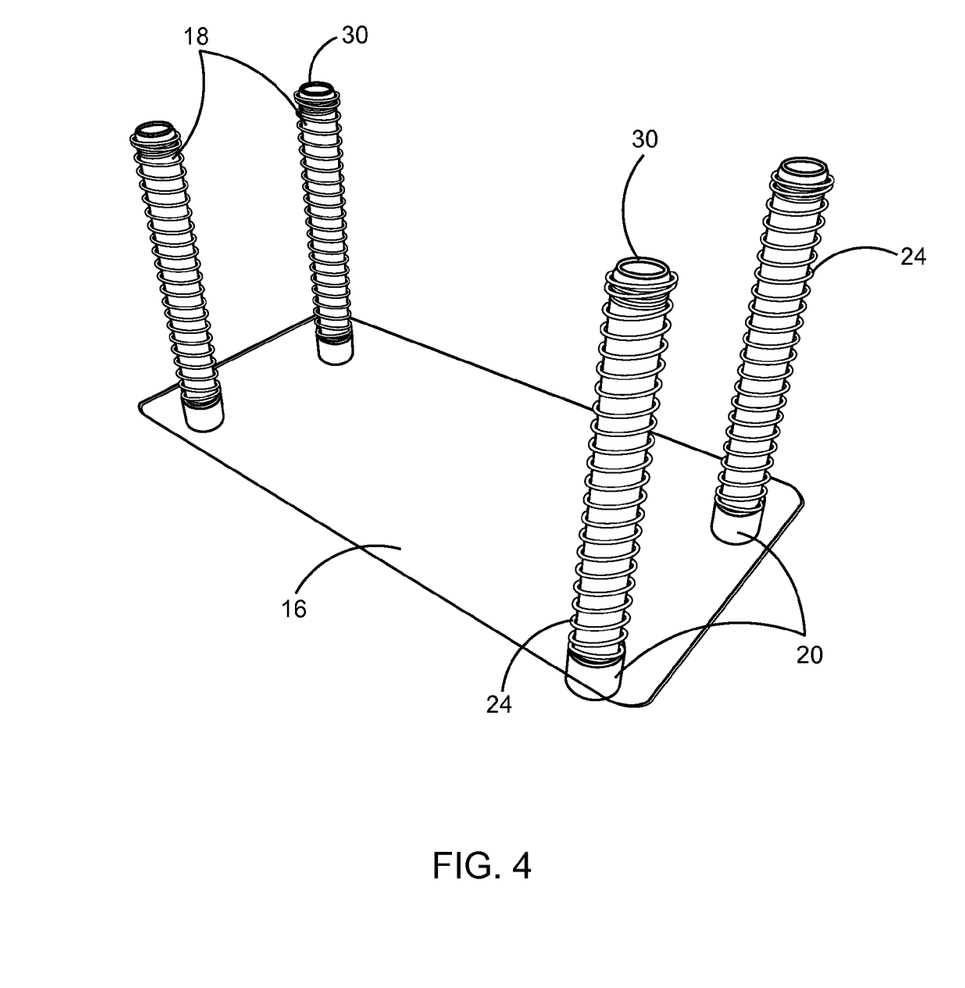
Figure 5:
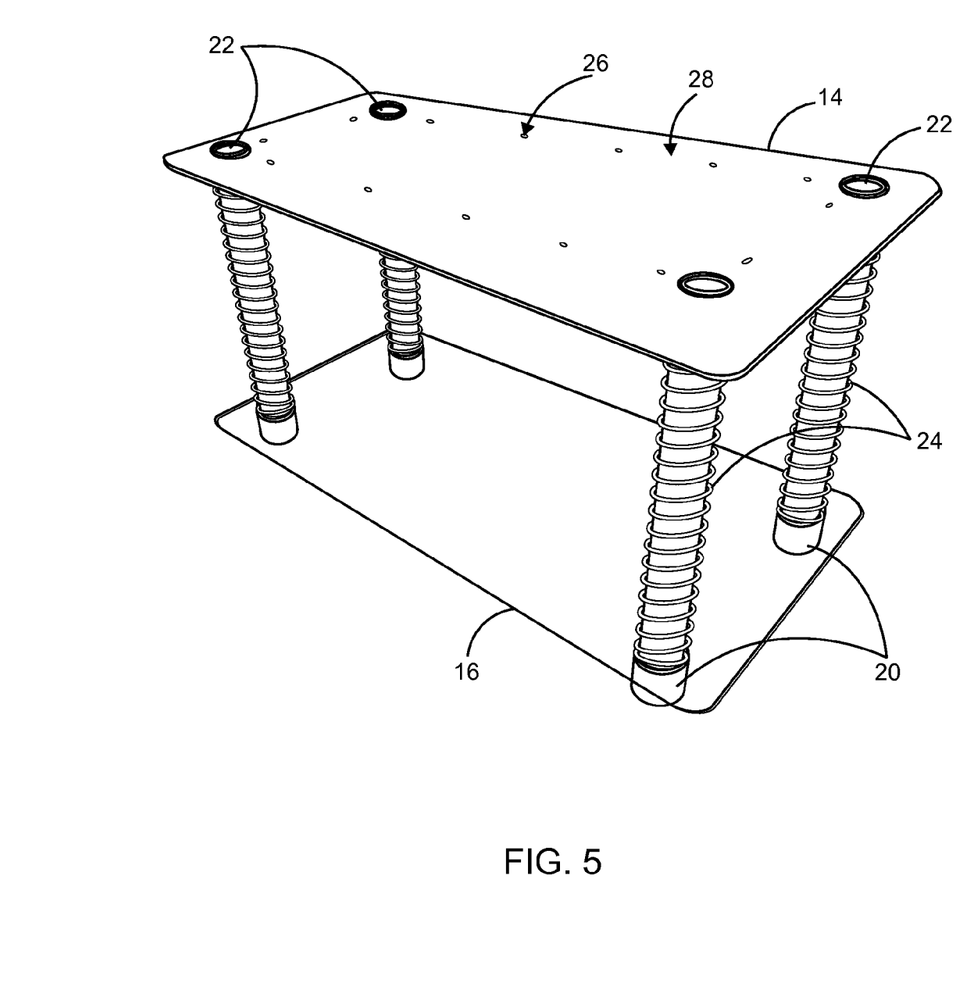

FIGS. 2-5 illustrate a method for assembling the food organizing insert 10 in accordance with a preferred embodiment of the present invention. The method is initiated by inserting the plurality of posts 18 into the bottom shelf 16 through the plurality of holes 22 and securing the bottom end(not shown) of each of the plurality of posts 18 with each of the threaded plugs 20 as shown in FIG. 2. Each of the plurality of posts 18 is then surrounded by the spring 24 as shown in FIG. 3. The spring 24 is made of a metal elected from a group consisting of: steel, aluminum. The top end 30 of the each of the plurality of posts 18 is then inserted through the plurality of holes 22 of the top shelf 14. Finally, the top end 30 is secured with the plurality of threaded plugs 20 so as to secure the plurality of posts 18 in position as illustrated in FIG. 5. Thus, the plurality of posts 18 is threaded at both ends and is held in place by the plurality of holes 22, pressure caused by the spring 24 and the plurality of threaded plugs 20.

While using the insert 10, the top shelf 14 may be initially loaded with the food items, drinks and ice. The weight of the food items, drinks and ice lowers the top shelf 14 until it reaches the bottom surface (not shown) of the ice chest 12. When the springs 24 have reached the limit to which the springs 24 can compress, the top shelf 14 may be left only inches above the bottoms surface of the ice chest. As the food items and drinks are taken out of the top shelf 14, the weight loss allows the top shelf 14 to slowly and gently rise. As time passes, ice starts melting from the top shelf 14, thereby allowing the top shelf 14 to rise gently. The melted ice water is then allowed to drip from sides 32 of the top shelf 14. Alternately, the melted ice water may also drip from the perforated natural drip dry system 26. Finally, the melted ice water containing the germs and bacteria is allowed to rest at the bottom surface (not shown) of the ice chest 12.

Figure 6:
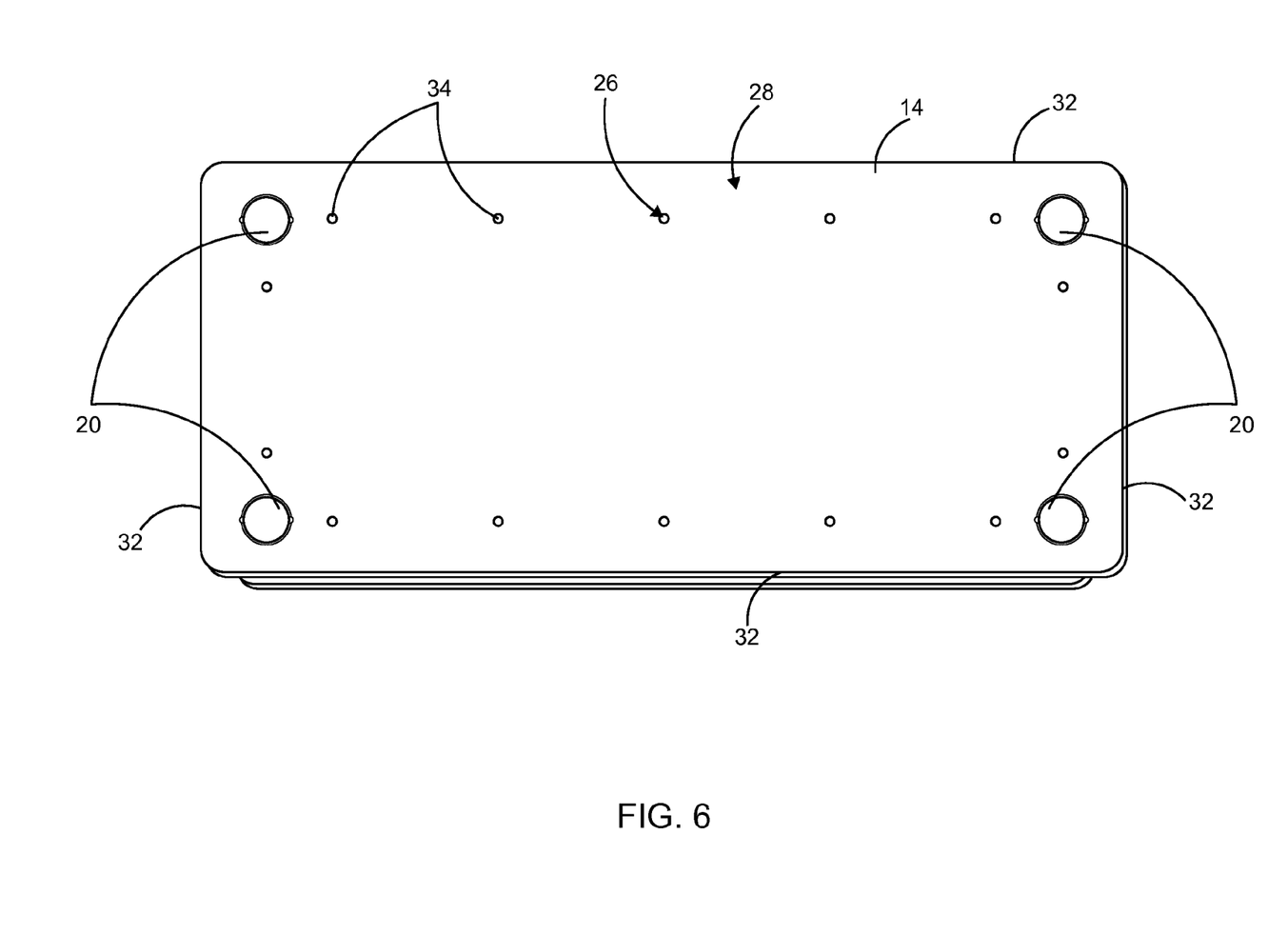
FIG. 6 illustrates a top view of the food organizing insert in accordance with the preferred embodiment of the present invention.

FIG. 6 illustrates a top view of the food organizing insert 10 in accordance with a preferred embodiment of the present invention. The perforated natural drip dry system 26 includes a plurality of perforations 34 that allows melted ice water to drip from the top shelf 14. The food organizing insert 10 also allows melted ice water to drip from sides 32 of the top shelf 14.

Figure 7:
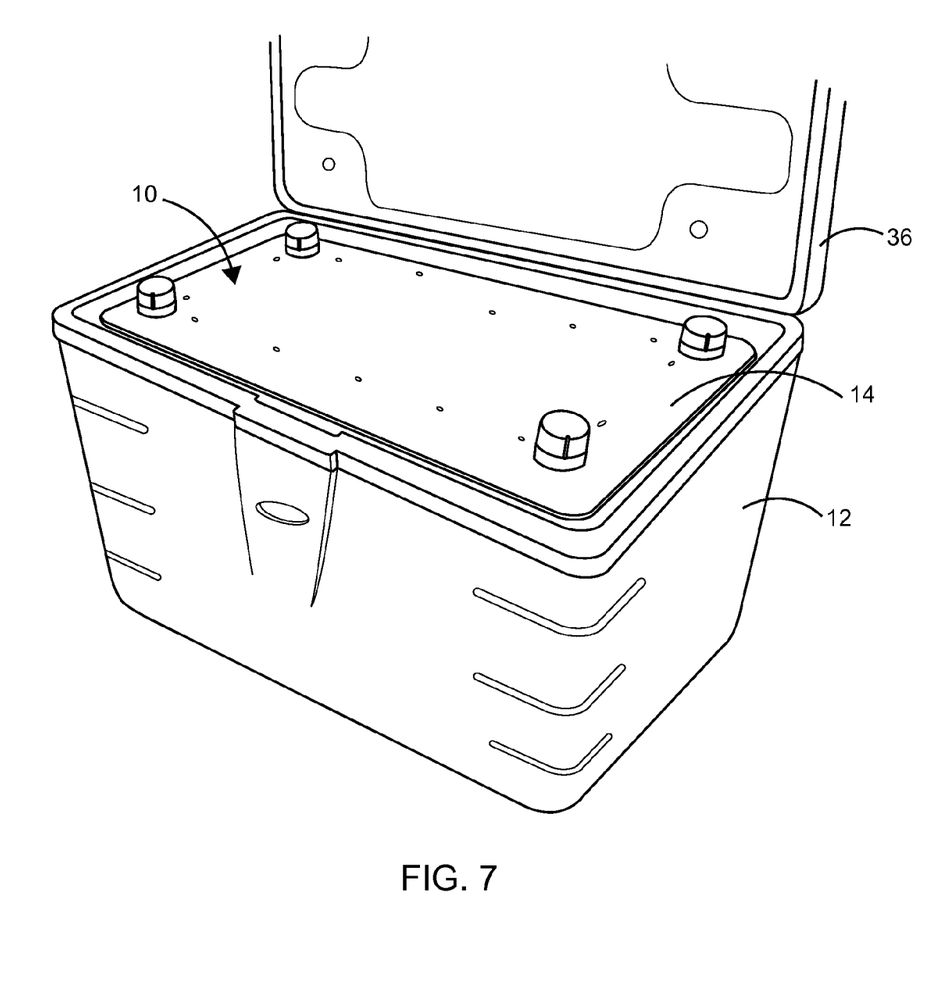
FIG. 7 illustrates the food organizing insert placed within the ice chest in accordance with the preferred embodiment of the present invention.

Referring to FIG. 7, the food organizing insert 10 placed within the ice chest 12 in accordance with the preferred embodiment of the present invention is illustrated. The insert 10 is initially placed within the ice chest 12 and the top shelf 14 is loaded with food items, drinks and ice. Since the weight of the food items, drinks and ice lowers the top shelf 14 until it reaches the bottom surface of the ice chest 12, the lid 36 of the ice chest 12 can be easily closed to initiate cooling. As the food items and drinks are taken out of the top shelf 14, the weight loss allows the top shelf 14 to slowly and gently rise.

The insert 10 can then be easily taken out from the ice chest 12 for cleaning and storage. The insert 10 is designed in such a way that the insert 10 can be easily assembled by a user. While using this simple, spring-loaded food organizing insert 10 within the ice chest 12, the task of cleaning the insert 10 can be accomplished easily by separating the insert from the ice chest 12.

The present invention is primarily intended for use within ice chests or coolers. The insert 10 of the present invention provides a simple, convenient and portable insert for holding the food items and drinks in a chilled and clean condition above the dirty water. The spring-loaded top shelf 14 lowers and rises within the ice chest. The insert 10 allows melted ice water to easily drip from the top shelf 14 and rest at a bottom surface of the ice chest 12. The insert 10 can be easily assembled by the user. The insert 10 can also be easily disassembled for proper cleaning and compact storage. The insert 10 is made of a light-weight material such as plastic and hence can be easily stored and carried by the user.

The invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention. For example, components of the food organizing insert 10 can be varied in size, materials, shape, form, function and assembly in accordance with the intended use. Accordingly, it is not intended that the invention be limited, except as by the appended claims.

What is claimed is:

1. A food organizing insert for placement within an ice chest, the insert comprising:
   a top shelf arranged for placing food items, drinks and ice, the top shelf being provided with a perforated natural drip dry system on a top surface;
   a bottom shelf attached to the top shelf by way of a plurality of posts, each of the plurality of posts being singular in structure and threaded at both ends and surrounded by a spring;
   a plurality of threaded plugs designed to secure the plurality of posts in position, the plurality of plugs being provided for insuring safety; and
   a plurality of holes positioned on the top shelf and the bottom shelf, the plurality of holes being provided to insert the plurality of posts;
   whereby the food organizing insert is placed within the ice chest to maintain the food items, drinks and ice in a chilled condition.

2. The food organizing insert of claim 1 wherein the top shelf lowers along the plurality of posts when the top shelf is loaded with the food items, drinks and ice.

3. The food organizing insert of claim 1 wherein the top shelf gently rises when the food items, drinks and ice are unloaded.

4. The food organizing insert of claim 1 wherein the perforated drip dry system allows melted ice water to drip from the top shelf.

5. The food organizing insert of claim 1 wherein the insert allows melted ice water to drip from sides of the top shelf.

6. The food organizing insert of claim 1 wherein melted ice water rests at a bottom surface of the ice chest.

7. The food organizing insert of claim 1 wherein the plurality of posts is held in position by the plurality of threaded plugs, pressure of the spring and the plurality of holes.

8. The food organizing insert of claim 1 wherein the food organizing insert can be easily taken out from the ice chest for cleaning and storage.

9. The food organizing insert of claim 1 is portable.

10. The food organizing insert of claim 1 can be easily assembled by a user.

11. The food organizing insert of claim 1 can be easily disassembled for cleaning and storage.

* * * * *